US010657323B2

(12) United States Patent
Lysanov

(10) Patent No.: US 10,657,323 B2
(45) Date of Patent: May 19, 2020

(54) METHOD OF PREPARING DOCUMENTS IN MARKUP LANGUAGES

(71) Applicant: OBSCHESTVO S OGRANICHENNOY OTVETSTVENNOSTYU "INTERSOFT", Moscow (RU)

(72) Inventor: Pavel Urjevich Lysanov, Moscow (RU)

(73) Assignee: OBSCHESTVO S OGRANICHENNOY OTVETSTVENNOSTYU "INTERSOFT", Moscow (RU)

( * ) Notice: Subject to any disclaimer, the term of this patent is extended or adjusted under 35 U.S.C. 154(b) by 0 days.

(21) Appl. No.: 15/534,465

(22) PCT Filed: Sep. 30, 2015

(86) PCT No.: PCT/RU2015/000633
§ 371 (c)(1),
(2) Date: Jun. 8, 2017

(87) PCT Pub. No.: WO2017/058047
PCT Pub. Date: Apr. 6, 2017

(65) Prior Publication Data
US 2017/0351656 A1 Dec. 7, 2017

(51) Int. Cl.
*G06F 40/186* (2020.01)
*G06F 9/455* (2018.01)
(Continued)

(52) U.S. Cl.
CPC .......... *G06F 40/186* (2020.01); *G06F 3/0482* (2013.01); *G06F 3/0486* (2013.01);
(Continued)

(58) Field of Classification Search
CPC .. G06F 17/2247; G06F 17/24; G06F 17/3089; G06F 17/248; G06F 11/3668; G06F 17/211; G06F 17/218
See application file for complete search history.

(56) References Cited

U.S. PATENT DOCUMENTS 6,230,161 B1 * 5/2001 Berkland .................. G06F 8/36
6,262,729 B1 * 7/2001 Marcos ..................... G06F 8/20
715/744
(Continued)

FOREIGN PATENT DOCUMENTS

EA 012691 12/2009
JP 20095088228 1/2006
(Continued)

OTHER PUBLICATIONS

Written Opinion of the International Search Authority for PCT/RU 2015/000633.
(Continued)

*Primary Examiner* — Wilson W Tsui
(74) *Attorney, Agent, or Firm* — Anglehart et al.

(57) ABSTRACT

The present technical solution relates to user interfaces in general and specifically to user interfaces intended for working with data of computer information systems. A method for preparing documents written in markup languages while implementing a user interface for working with data of an information system, such that: forming at least one entity class, entity class attributes, datasets, and dataset elements including at least dataset fields and dataset aggregate functions; forming a template for presenting instances of the entity class, the template includes at least one document written in at least one markup language; forming and storing a link between the template and the entity class; displaying the template, forming and storing
(Continued)

18 Claims, 14 Drawing Sheets

(51) Int. Cl.
G06F 8/38 (2018.01)
G06F 16/904 (2019.01)
G06F 40/14 (2020.01)
G06F 40/131 (2020.01)
G06F 40/134 (2020.01)
G06F 40/177 (2020.01)
G06F 40/197 (2020.01)
G06F 3/0482 (2013.01)
G06F 3/0486 (2013.01)

(52) U.S. Cl.
CPC ............ *G06F 8/38* (2013.01); *G06F 9/45508* (2013.01); *G06F 16/904* (2019.01); *G06F 40/131* (2020.01); *G06F 40/134* (2020.01); *G06F 40/14* (2020.01); *G06F 40/177* (2020.01); *G06F 40/197* (2020.01)

(56) References Cited

U.S. PATENT DOCUMENTS

| | | | |
|---|---|---|---|
| 6,418,448 B1 | 7/2002 | Sarkar | |
| 6,964,014 B1* | 11/2005 | Parish | G06F 17/3089 704/260 |
| 7,421,445 B2* | 9/2008 | O'Neil | G06F 17/30917 |
| 7,698,631 B1* | 4/2010 | Toebes | G06F 17/24 715/234 |
| 7,707,545 B2 | 4/2010 | Boshier et al. | |
| 7,844,644 B2* | 11/2010 | Shin | G06F 17/2229 707/821 |
| 7,921,137 B2 | 4/2011 | Lieske et al. | |
| 8,078,979 B2* | 12/2011 | Howard | G06F 3/0481 382/305 |
| 8,082,322 B1* | 12/2011 | Pascarella | G06F 9/541 707/759 |
| 8,387,006 B1* | 2/2013 | Taylor | G06F 17/3089 717/110 |
| 8,522,134 B1* | 8/2013 | Zetlen | G06F 17/218 715/234 |
| 9,639,517 B2* | 5/2017 | Horiuchi | G06F 17/248 |
| 2002/0073125 A1* | 6/2002 | Bier | G06F 17/24 715/255 |
| 2004/0148576 A1* | 7/2004 | Matveyenko | G06F 17/2247 715/235 |
| 2004/0268231 A1* | 12/2004 | Tunning | G06F 17/2247 715/236 |
| 2006/0004845 A1 | 1/2006 | Kristiansen et al. | |
| 2013/0117731 A1* | 5/2013 | LeSuer | G06F 11/3672 717/125 |
| 2014/0304682 A1* | 10/2014 | Taylor | G06F 9/45529 717/113 |
| 2014/0351692 A1* | 11/2014 | Ge | G06F 17/2247 715/235 |
| 2015/0220649 A1 | 8/2015 | Papa et al. | |
| 2015/0317405 A1* | 11/2015 | Manchester | G06F 17/2229 715/234 |

FOREIGN PATENT DOCUMENTS

| | | |
|---|---|---|
| RU | 2368943 | 9/2009 |
| RU | 2382403 | 2/2010 |
| RU | 2386997 | 4/2010 |
| WO | 2007/030683 | 3/2007 |
| WO | 2009/045918 | 4/2009 |

OTHER PUBLICATIONS

ISR for PCT/RU 2015/000633.
European application No. 15905519.3 supplementary European search report dated Feb. 27, 2019.
David R. Karger et al: "The web page as a WYSIWYG end-user customizable database-backed information management application", Proceedings of the 22nd Annual ACM Symposium on User Interface Software and Technology: Victoria, British Columbia, Oct. 4-7, 2009, Oct. 4, 2008, p. 257, XP055557895.
David F Huynh et al : "Exhibit: Lightweight Structured Data Publishing ", 16th International World Wide Web Conference, WWW2007—Banff, Alberta, Canada, Association for Computing Machinery US, 2 Penn Plaza, Suite 701NEW YORKNY10121-0701USA, May 8, 2007, p. 737-746, XP058380292.
Luo Xiongfei et al: "Sythesis Vis: A Web Site Supporting Collaborative Information Visulization", Computer Graphics, Imaging and Visualization, 2009. CGIV ' 09. Sixth International Conference on, Aug. 2009(Aug. 2009), pp. 443-448, XP055557408.
D. Karger: "Standards opportunities around data-bearing Web pages", Royal Socierty of London. Philosophical Transactions. Mathematical, Physical and Engineering Sciences, vol. 371, No. 1987, Feb. 18, 2013(Feb. 18, 2013), pp. 20120381-20120381.
Fernanad B. Viegas et al : "ManEyes : a Site for Visualization at Internet Scale", IEEE Transactions on Visualization and Computer Graphics., vol. 13, No. 6, Nov. 2007(Nov. 2007), pp. 1121-1128, XP055547994.

* cited by examiner

```
<body>
  <h1>Plan</h1>
  <div class="header-table">
    <div class="table-row">
      <div class="table-cell" style="text-align: right;">
        Subdivision:
      </div>
      <div class="table-cell"> Subdivision 1 </div>
    </div>
    ...
  </div>
  <hr/>
  <div class="data-table">
    <div class="table-row table-header">
      <div class="table-cell">№<br/>п/п</div>
      <div class="table-cell" style="width: 50%">
        Formulation
      </div>
      <div class="table-cell">Deadline</div>
      <div class="table-cell">Responsible person</div>
      <div class="table-cell">
        Planned <br/>Staff time, man/hour
      </div>
    </div>
    <div class="table-row">
      <div class="table-cell">1</div>
      <div class="table-cell"> Formulation 1 </div>
      <div class="table-cell">15.08.2029</div>
      <div class="table-cell">Surname, Name</div>
      <div class="table-cell align-right">19</div>
    </div>
    <div class="table-row">
      ...
      <div class="table-footer align-right">Total:</div>
      <div class="table-footer align-right"> 99 999 </div>
    </div>
  </div>
</body>
```

```
<!DOCTYPE html>
<html>
 <head>
  <title>example of including lib</title><meta charset="UTF-8">
  <script type="text/javascript" src="edit_library"></script>           ―― 138
  <script type="text/javascript">
            var entity_occurence_id = 1 ;                                ―― 139
    window.onload = prepare_for_edit;                                    ―― 142
  </script>
 </head>
 <body> ... </body>
</html>
```

―― 140

```
<!DOCTYPE html>
<html>
 <head>
  <title>example of including lib</title><meta charset="UTF-8">
  <script type="text/javascript">
    ...
    function prepare_for_edit() {
    ...
    }                                                                    ―― 141
    ...
            var entity_occurence_id = 1 ;
    window.onload = prepare_for_edit;                                    ―― 142
  </script>
 </head>
 <body> ... </body>
</html>
```

Fig. 9

```
var data_and_metadata = {
  "entity_occurence_id":1,
  "entity_attributes":[
    {"id":1,"value":"Marketing department","path":"3;1;3"},
    {"id":2,"value":"2018","path":"3;3;3"},
    {"id":3,"value":"01","path":"3;5;3"}
  ],
  "data_sets":[{
    "target_elements_group_root_path":"7;3",
    "fields_paths":["1","3","5","7","9"],
    "fields_data_by_rows":[
      ["1","Prepare a report on competitors' prices","25.01.2018","Smith John","40"],
      ["2","Develop a sales promotion schedule","15.01.2018","Doe Jane","24"]
    ],
    "aggregates":[{"value":"64","path":"7;5;9"}]
  }]
}
```

143 — var data_and_metadata / "entity_occurence_id":1,
144 — "entity_attributes":[
145 — "data_sets":[{
145 — "target_elements_group_root_path":"7;3",
146 — "fields_paths":["1","3","5","7","9"],
147 — "fields_data_by_rows":[
148 — (data rows)
149 — "aggregates":[{"value":"64","path":"7;5;9"}]

Fig. 10

```
function get_element_by_path(root_element, path) {
  var curr_element = root_element;
  path = ";" + path;
  while (path != '') {
    path.match(/^;(\d*)(;.*)?$/);
    curr_element = curr_element.childNodes.item(RegExp.$1);
    path = RegExp.$2;
  }
  return curr_element;
}
```

150

```
function place_attributes_values() {
  var cur_el;
  for (i = 0; i < data_and_metadata.entity_attributes.length; i++) {
    cur_el = get_element_by_path(document.body,
      data_and_metadata.entity_attributes[i].path);
    cur_el.childNodes.item(0).nodeValue =
      data_and_metadata.entity_attributes[i].value;
  }
}
```

151

```
function place_data_sets_aggregates() {
  var cur_el;
  for (i = 0; i < data_and_metadata.data_sets.length; i++) {
    for (j = 0; j < data_and_metadata.data_sets[i].aggregates.length; j++) {
      cur_el = get_element_by_path(document.body,
        data_and_metadata.data_sets[i].aggregates[j].path);
      cur_el.childNodes.item(0).nodeValue =
        data_and_metadata.data_sets[i].aggregates[j].value;
    }
  }
}
```

```
function place_data_sets_rows() {
    var current_group_root;
    var cloned_node;
    var cur_el;
    for (i = 0; i < data_and_metadata.data_sets.length; i++) {
        current_group_root = get_element_by_path(document.body,
            data_and_metadata.data_sets[i].target_elements_group_root_path);
        for (j = data_and_metadata.data_sets[i].fields_data_by_rows.length - 1; j >= 0; j--) {
            if (j < data_and_metadata.data_sets[i].fields_data_by_rows.length - 1) {
                cloned_node = current_group_root.cloneNode(true);
                current_group_root.parentNode.insertBefore(cloned_node, current_group_root);
                current_group_root = cloned_node;
            }
            for (k = 0; k < data_and_metadata.data_sets[i].fields_data_by_rows[j].length; k++) {
                cur_el = get_element_by_path(current_group_root, data_and_metadata.data_sets[i].fields_paths[k]);
                cur_el.childNodes.item(0).nodeValue = data_and_metadata.data_sets[i].fields_data_by_rows[j][k];
            }
        }
    }
}
```

Fig. 12

Plan

Subdivision: Marketing Department

Year: 2018
Month: 01

| № | Formulation | Deadline | Responsible Person | Staff time man/hour |
|---|---|---|---|---|
| 1 | Prepare a report on competitors' prices | 25.01.2018 | Smith John | 40 |
| 2 | Develop a sales promotion schedule | 15.01.2018 | Doe Jane | 24 |
| | | | Total: | 64 |

Fig. 13

METHOD OF PREPARING DOCUMENTS IN MARKUP LANGUAGES

The present technical solution relates to user interfaces in general and more specifically to user interfaces related to dealing with data in computer information systems.

BACKGROUND

Data in computer information systems is usually operated via entity instances having a certain permanent or variable set of attributes. Nowadays, markup languages that include, but are not limited to, HTML and XML, are widely used in the computer information systems for storing, transmitting, publishing, and other tasks of data handling including among others implementing a user interface; wherein, arguably, the most popular methods are ones where values of entity instance attributes are included in documents written in markup languages and provided to a user for processing in a browser. A user is able to view and to edit the values of entity instance attributes in the browser, as well as to store changed values in an information system. It should be noted that documents written in markup languages contain data and auxiliary elements, the auxiliary elements determine styles and/or a location for displaying of the data in the browser, as well as the meaning of the data. Moreover, such documents may contain design elements (for example, background images), auxiliary textual elements (for example, descriptive notes) and other elements not related to data.

In order to provide a user with an entity instance of the information system to process by browser, values of entity instance attributes (data) need located within the documents written in a markup language.

Prior art provides a method where blocks of program code are inserted into documents written in markup languages, the blocks are then processed by a pre-processor leading to having the code blocks being replaced with the result created by running the code. This method requires additional specific knowledge that includes at least of the knowledge of syntax of a programming language, which is used to form the program code blocks for inserting into documents written in markup languages. This method is also time consuming due to the process of inserting the program code blocks into documents written in markup languages for processing by the pre-processor.

Prior art provides another method where special symbols and variables associated with the special symbols are inserted into locations destined for data within the documents written in markup languages; the special symbols and variables associated with the special symbols are replaced by data during a process of preparing to transmit the documents to the browser. Processing of such documents, also known as "templates", is performed via so called template processors, for example, by ApacheVelocity. This method requires additional specific knowledge that includes at least of the syntax of a template processor. This method is also time consuming due to the process of inserting the special symbols and variables associated with the special symbols into documents written in markup languages and their continuous updating that may arise in cases of changing or developing of the syntax of a template processor.

SUMMARY

Further is presented a simplified description of the technical solution as an aid to understanding its certain aspects. This summary is not an extensive overview. It is not intended to identify key or critical elements of the present technology. Its sole purpose is to present one or more aspects in a simplified form as a prelude to the more detailed description of the technology that follows.

It is an object of the present technology to ameliorate at least some of the inconveniences present in the prior art.

A technical effect of embodiments of the present technology allows optimizing a process of preparing documents written in markup languages while implementing a user interface for dealing with data of an information system, optimizing time for preparing the documents and simplifying their further maintenance. The technical effect is justified by eliminating the need of inserting additional information into documents written in markup languages, the additional information otherwise being intended for management of displaying the data of the information system included in the documents. Further effects are: upgraded convenience of preparing the documents written in markup languages for implementing a user interface for dealing with data of an information system and lowering the specific knowledge requirement for users creating such documents.

The given technical effect is achieved by means of applying the method of preparing documents written in markup languages during implementation of a user interface for dealing with data of an information system, in the method metadata is formed for at least one entity class, its attributes, datasets, and dataset elements including at least dataset fields and dataset aggregate functions 154 (FIG. 14); a template is formed for presenting instances of said entity class, the template includes at least one document written in at least one markup language 155 (FIG. 14); a link between the template and the entity class is formed and stored 156 (FIG. 14); the template is displayed, links between the template elements and entity class attributes, datasets, fields and aggregate functions 157 (FIG. 14) are formed and stored; in the meantime: a template element is selected and information about entity class attributes, datasets, datasets fields and datasets aggregate functions available for link forming is displayed; an entity class attribute, or a dataset, or a dataset field, or a dataset aggregate function is selected; a link including an identifier of the template element selected previously and an identifier of the entity class attribute, or the dataset, or the dataset field, or the dataset aggregate function selected previously is formed and stored.

In some implementations of the technical solution, datasets include attribute values and aggregate function values calculated based on values of these attributes, the attributes belong to entity instances associated with an entity instance being presented.

In some implementations of the technical solution, the markup language is HTML, or XML, or XHTML, or DocBook.

In some implementations of the technical solution, the template is formed using text editors with syntax highlight, or WYSIWYG-editors, or online editors.

In some implementations of the technical solution, values for template elements, the template elements are intended to present values of entity class instance attributes, are established using data types and sizes corresponding to the entity class attributes.

In some implementations of the technical solution, values for template elements, the template elements are intended to present values of entity class instance attributes, are established using data types and sizes corresponding to dataset elements.

In some implementations of the technical solution, in the template for presenting entity class instances, groups of elements for presenting dataset elements are further formed and structural elements are created, the structural elements being root elements of fragments of the document hierarchic structure, the fragments include all elements of corresponding said element groups.

In some implementations of the technical solution, the formed template is stored on a server in a database.

In some implementations of the technical solution, information about the formed link between the template and an entity class is stored on the server in the database.

In some implementations of the technical solution, within the information about the formed link between the template and an entity class, a template type identifier and a user language identifier are further stored, said language being used for forming values of auxiliary elements of the template.

In some implementations of the technical solution, prior to displaying the template, the server retrieves the template from the database and inserts into the template the following elements: an element with the entity class identifier using information about the link between the template and the entity class; and an element enabling a program code library, the code intended to provide the user with an opportunity to form and store links between the template elements and entity class attributes, datasets, datasets fields and datasets aggregate functions.

In some implementations of the technical solution, the program code library is implemented in a programming language supported by the browser.

In some implementations of the technical solution, the programming language supported by the browser is JavaScript or Dart.

In some implementations of the technical solution, the program code library is located on a remote server available via the Internet.

In some implementations of the technical solution, prior to displaying the template, the server retrieves the template from the database and inserts into the template the following elements: an element with the entity class identifier using information about the link between the template and the entity class; and an element with a program code intended to provide the user with an opportunity to form and store links between the template elements and entity class attributes, datasets, datasets fields and datasets aggregate functions.

In some implementations of the technical solution, for purposes of selecting a template element, the element becomes graphically marked at a time when a user locates a pointer on the template element.

In some implementations of the technical solution, the information about entity class attributes, datasets, their fields and aggregate functions available for forming links, is displayed as lists, the lists include only available attributes, datasets, their fields and aggregate functions, the attributes, datasets, their fields and aggregate functions not yet associated with any template element.

In some implementations of the technical solution, the information about entity class attributes, datasets, their fields and aggregate functions available for forming links, is displayed in a separate browser window or in a movable area within a window displaying the template, furthermore, forming the links to the template elements is implemented via employing the Drag-and-Drop technique.

In some implementations of the technical solution, while selecting a template element whose displayed area is fully covered by displayed areas of its child elements, thus preventing the element from being selected, the selection is done by selecting any child element, followed by selecting further parent elements, until the required template element becomes available to be selected in order to allow the forming of a link to an entity class attribute, or a dataset, or a dataset field, or a dataset aggregate function.

In some implementations of the technical solution, selecting a desired parent element is effected by employing a control element that is displayed along with lists of entity class attributes, datasets, their fields and aggregate functions available for forming a link.

In some implementations of the technical solution, after forming the link between the template element and the entity class attribute, or the dataset, or the dataset field or the dataset aggregate function this element becomes graphically marked.

In some implementations of the technical solution, a sequence of child element indexes is used as a template element identifier, the sequence of child element indexes leads to the element from a known template element.

In some implementations of the technical solution, an ID attribute value is used as a template element identifier.

In some implementations of the technical solution, unique ID attribute values for a template are set for all template elements automatically after forming the link between the template and the entity class.

In some implementations of the technical solution, a unique ID attribute value for the template is set automatically for the template element in the process of forming the link between this element and the entity class attribute, or the dataset, or the dataset field or the dataset aggregate function.

In some implementations of the technical solution, an expression for a request, the expression written in XPath language is used as a template element identifier.

In some implementations of the technical solution, a unique template value of the element is used as a template element identifier.

In some implementations of the technical solution, to retrieve template elements identifiers XPath language is used.

In some implementations of the technical solution, forming and storing the link of the entity class attribute, or the dataset, or the dataset field or the dataset aggregate function with the selected template element using the control element displayed along with the lists of entity class attributes, datasets, their fields and aggregate functions available for forming a link.

In some implementations of the technical solution, the formed links of the template elements with entity class attributes, datasets, their fields and aggregate functions are stored on the server in the database.

DESCRIPTION OF THE DRAWINGS

The following description and the accompanying drawings formulate illustrative aspects of the technical solution in more detail. However, these aspects show only some of various methods of some implementations of the given technical solution.

Features and advantages of the present technical solution will become apparent from the following detailed description and the accompanying drawings.

an entity class table 100 wherein entity class metadata are stored;

an entity attribute table 101 wherein entity attribute metadata are stored; a link between an entity attribute from the table 101 and an entity class from the table 100 is provided by storing a value of an entity class identifier within entity attribute metadata (in the "Class ID" attribute in the table 101);

a dataset table 102 wherein dataset metadata are stored; a link between a dataset from the table 102 and an entity class from the table 100 is provided by storing a value of an entity class identifier within dataset metadata (in the "Class ID" attribute in the table 102);

a dataset field table 103 wherein dataset field metadata are stored;

a link between a dataset field from the table 103 and a dataset from the table 102 is provided by storing a value of a dataset identifier within dataset field metadata (in the "Dataset ID" attribute in the table 103); a link between a dataset field from the table 103 and an entity class from the table 100 is provided by storing a value of an entity class identifier within dataset field metadata (in the "Class ID" attribute in the table 103);

a link between a dataset from the table 103 and an entity attribute from the table 101 is provided by storing a value of an entity attribute identifier within dataset field metadata (in the "Attribute ID" attribute in the table 103);

an aggregate function table 104 wherein dataset aggregate function metadata are stored; a link between an aggregate function from the table 104 and a dataset from the table 102 is provided by storing a value of an dataset identifier within aggregate function metadata (in the "Dataset ID" attribute in the table 104); a link between an aggregate function from the table 104 and a dataset field from the table 103 is provided by storing a value of an dataset field identifier within aggregate function metadata (in the "Field ID" attribute in the table 104).

Figure 2:
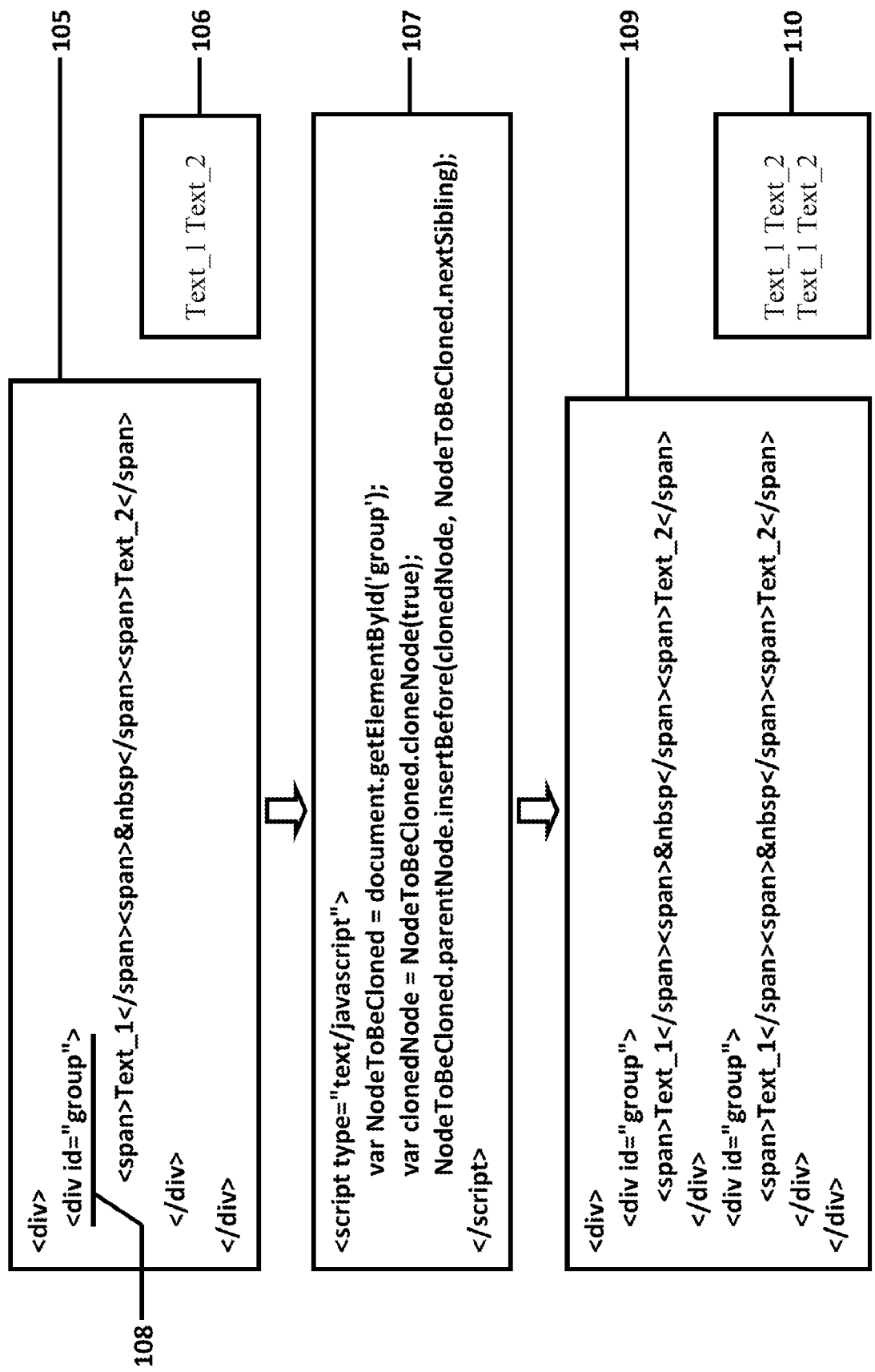

FIG. 2 depicts an example of a process of copying a fragment of a hierarchic structure of a document written in HTML using a program code written in JavaScript programming language in which there are indicated:

a fragment 105 of the hierarchic structure of the document written in HTML language and visualization 106 of this document in the browser;

a program code 107 written in JavaScript, the code copies an element 108 with nested elements and inserts the copy after the original;

a fragment 109 of the hierarchic structure of the document written in HTML language, the internal representation of which in the browser is similar to the internal representation of the result of work of the program code 107 and its visualization 110 in the browser is similar to the visualization of the result of work of the program code 107.

FIG. 3 depicts an abridged fragment of one of possible variants of a template written in HTML, in the fragment there are indicated:

an auxiliary element 111 of the "horizontal line" type;

an auxiliary message 112;

a template element 113 (to present a value of the "Subdivision" attribute of "Plan" entity instance) and a template value 114 of this element;

a root element 115 (for a group of elements intended for representation values of the "Task" entity instance attributes);

an element 116 of said group (intended for representation of a value of the "Formulation" attribute) and a template value 117 of this element;

an element 118 (intended for representation of a result of an aggregate function) and a template value 119 of this element.

Figure 4:
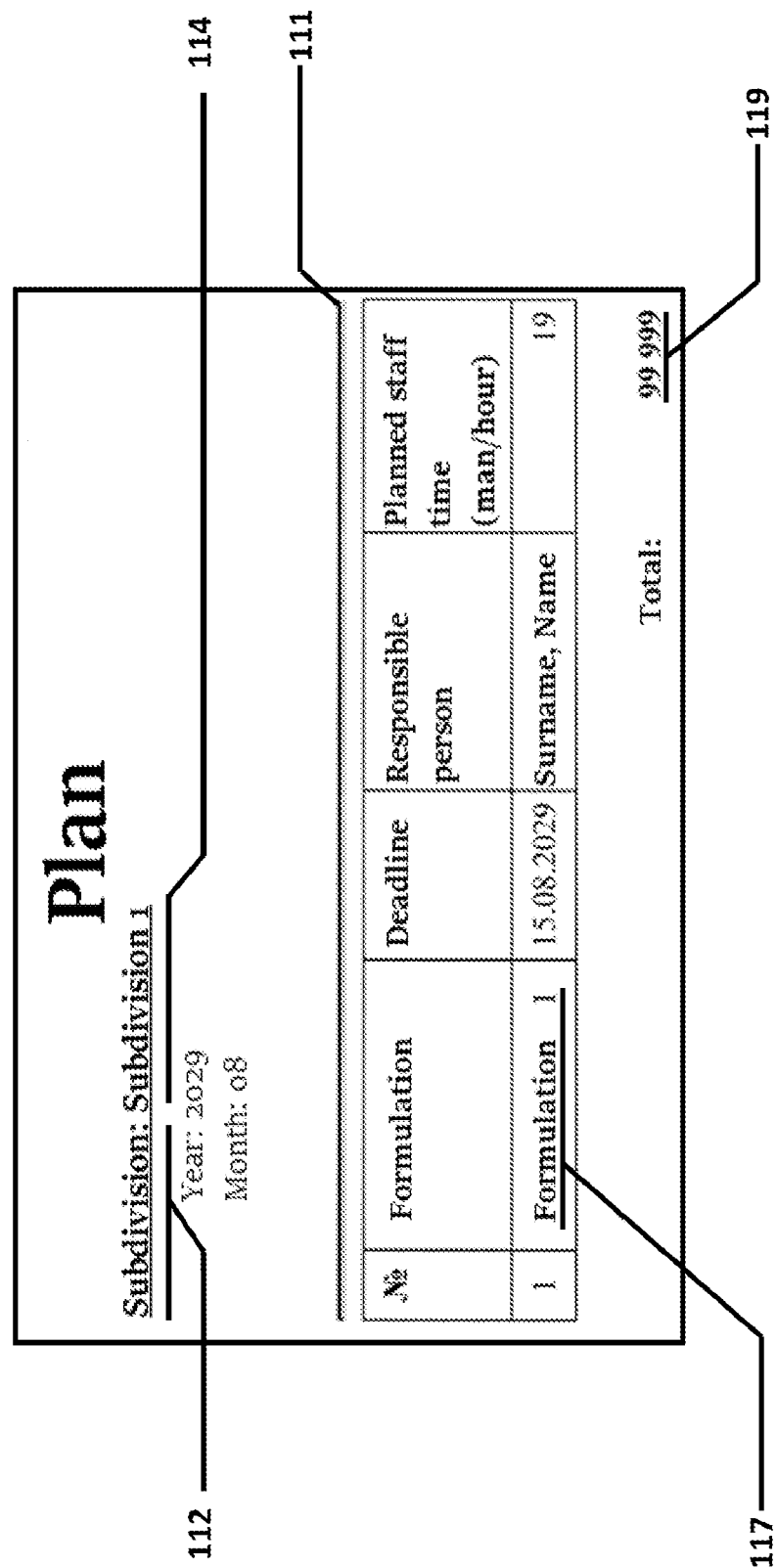

FIG. 4 depicts a visual representation, by the browser, of the abridged fragment of one of possible variants of the template written in HTML, the fragment depicted in FIG. 3, in the FIG. 4 there are indicated:

the auxiliary element 111 of the "horizontal line" type;

the auxiliary message 112;

template values 114, 117, and 119.

Figure 5:
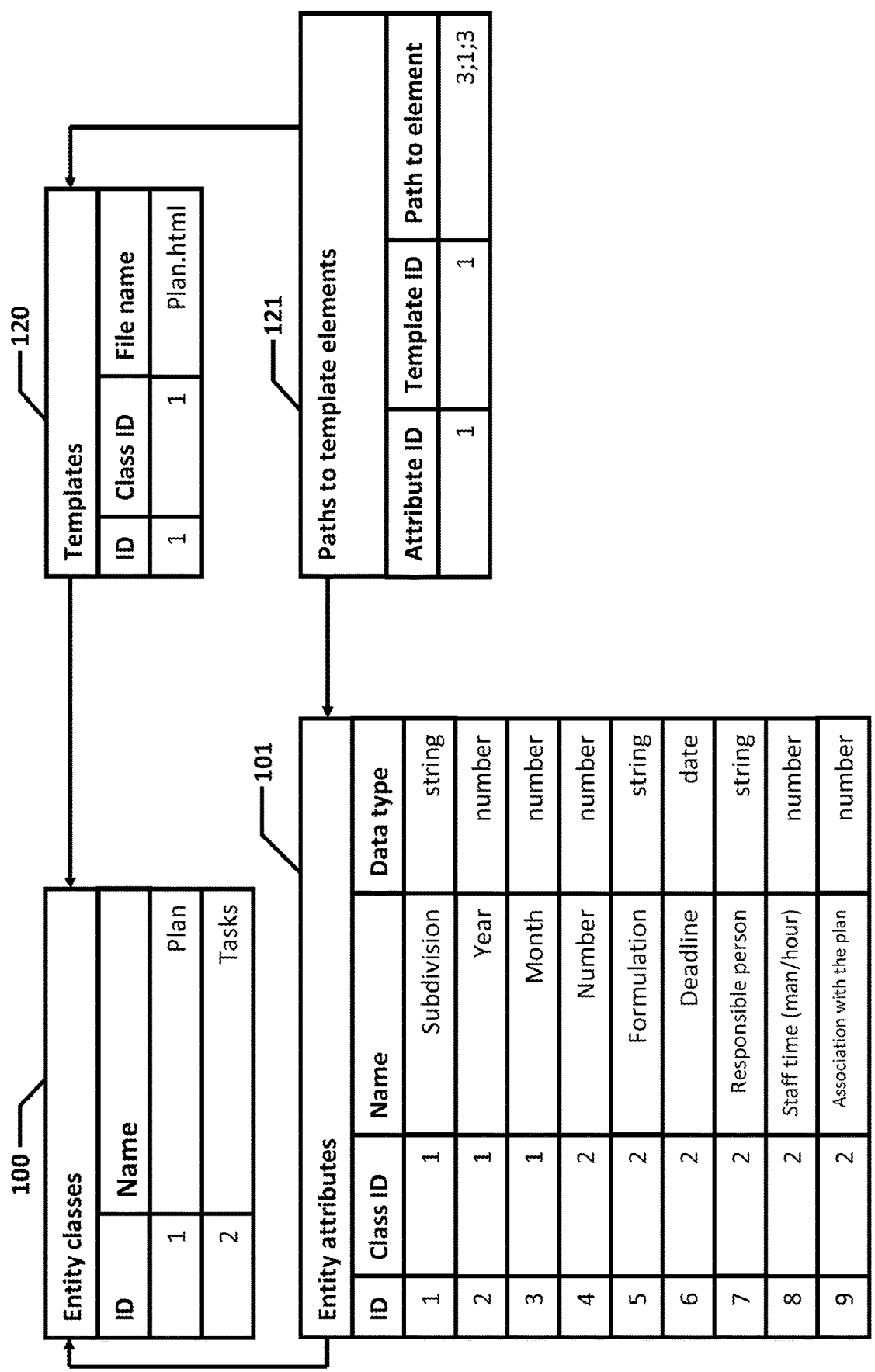

FIG. 5 depicts a fragment of a possible DB structure with an indication of an attribute content of tables, an approximate content of tables and links between tables (as arrows) and there are depicted:

an entity class table 100 wherein entity class metadata are stored;

an entity attribute table 101 wherein entity attribute metadata are stored; a link between an entity attribute from the table 101 and an entity class from the table 100 is provided by storing a value of an entity class identifier within entity attribute metadata (in the "Class ID" attribute in the table 101);

an entity instance representation template table 120 wherein template metadata are stored; a link between a template from the table 120 and an entity class from the table 100 is provided by storing a value of an entity class identifier within template metadata (in the "Class ID" attribute in the table 120);

a table 121 with paths to template elements wherein paths to target elements from root elements of templates (as strings including digital representations of numerical values of child element indexes placed from left to right and separated by a semicolon symbol) are stored; a link between a path from the table 101 and an entity attribute from the table 101 is provided by storing a value of an entity attribute identifier within the table 121 (in the "Attribute ID" attribute); a link between a path from the table 121 with a template from the table 120 is provided by storing a value of a template identifier within the table 121 (in the "Template ID" attribute).

Figure 6:
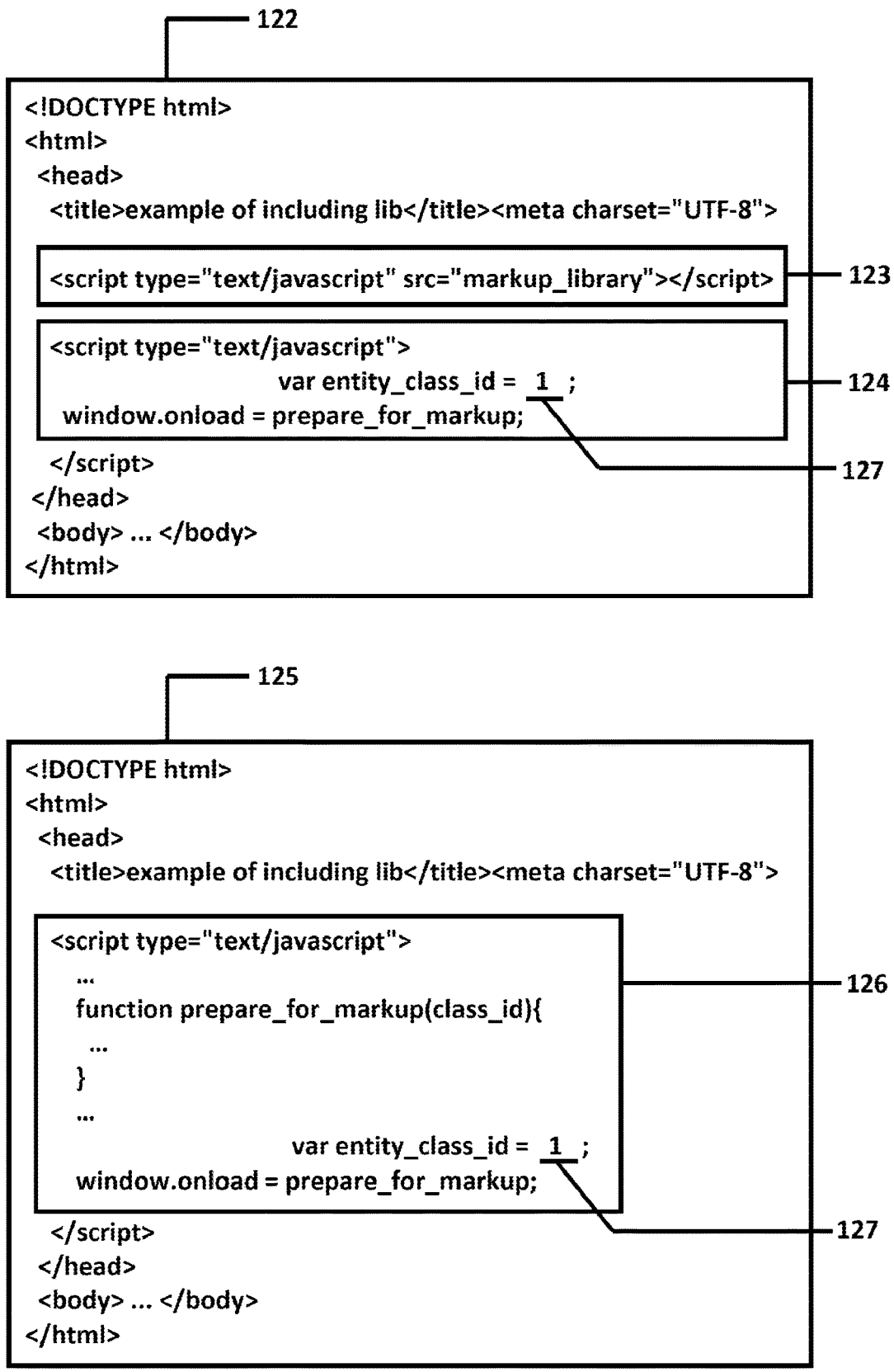

FIG. 6 depicts examples of possible variants of inserting into a template element for enabling a program code library, the program code provides user with an opportunity to form and store links between template elements and entity class attributes, datasets, their fields and aggregate functions (in case the template is formed in HTML language and the program code of the library is formed in JavaScript language). In FIG. 6 there are indicated:

an example 122 of a simplified template of an entity representation in HTML with an element 123 inserted by the server, the element 123 enables the program code library located in an external file named "markup_library";

an element 124 inserted into the template by the server, the element 124, after finishing loading the template by the browser, provides "prepare_for_markup" procedure call for preparing the template for forming and storing links between template elements and entity class attributes, datasets, their fields and aggregate functions;

an example 125 of a simplified template of an entity representation in HTML with an element 126 inserted by the server, the element 126 includes the program code of the library itself and, after finishing loading the template by the browser, provides "prepare_for_markup" procedure call for preparing the template for forming and storing links between template elements and entity class attributes, datasets, their fields and aggregate functions;

an entity class identifier 127, for representing instances of this identifier forming and storing links between template elements and entity class attributes, datasets, their fields and aggregate functions will be effected.

Figure 1:
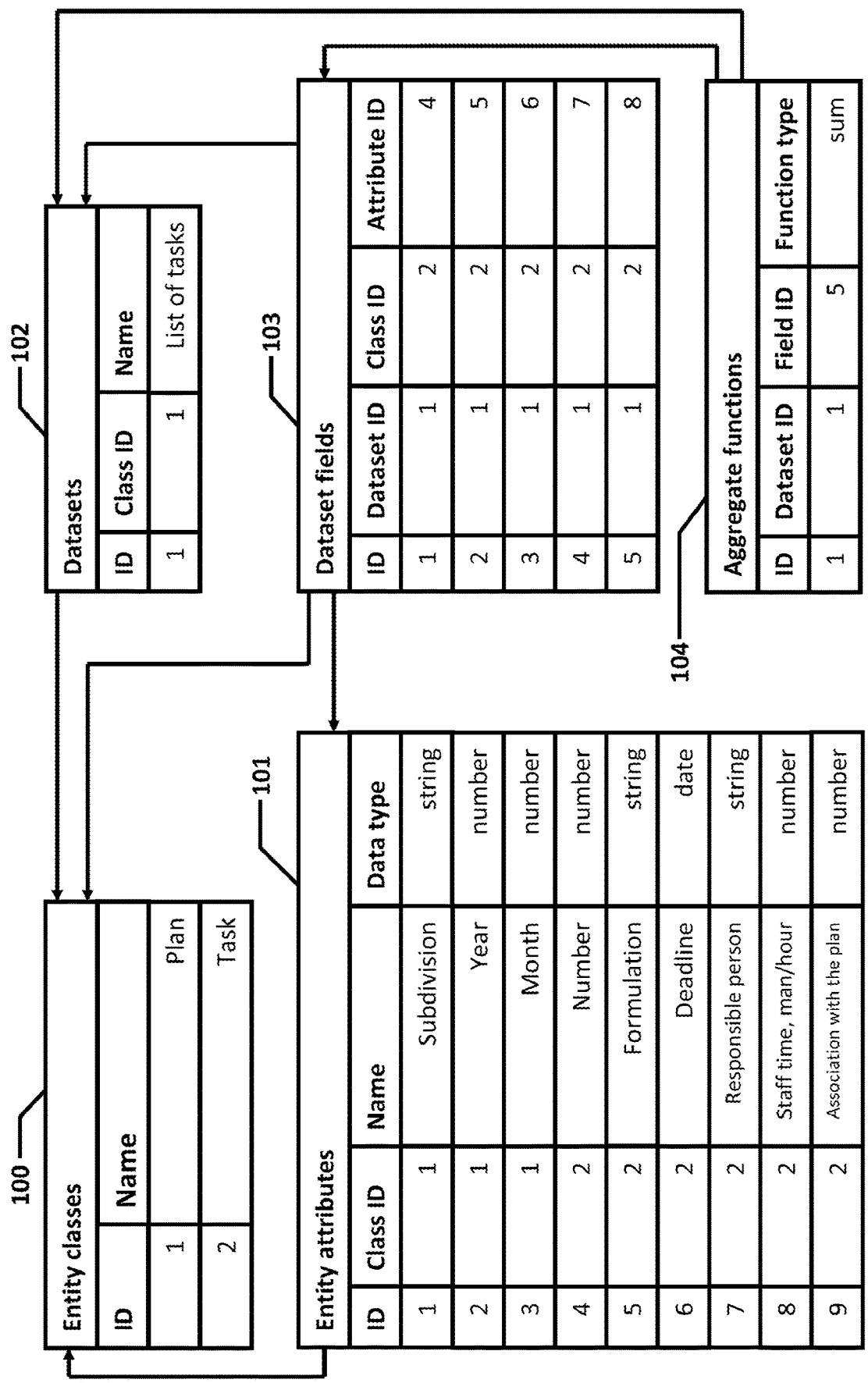
FIG. 1 depicts a fragment of a possible DB structure with an indication of an attribute content of tables, an approximate content of tables and links between tables (as arrows) and there are depicted.
Figure 7:
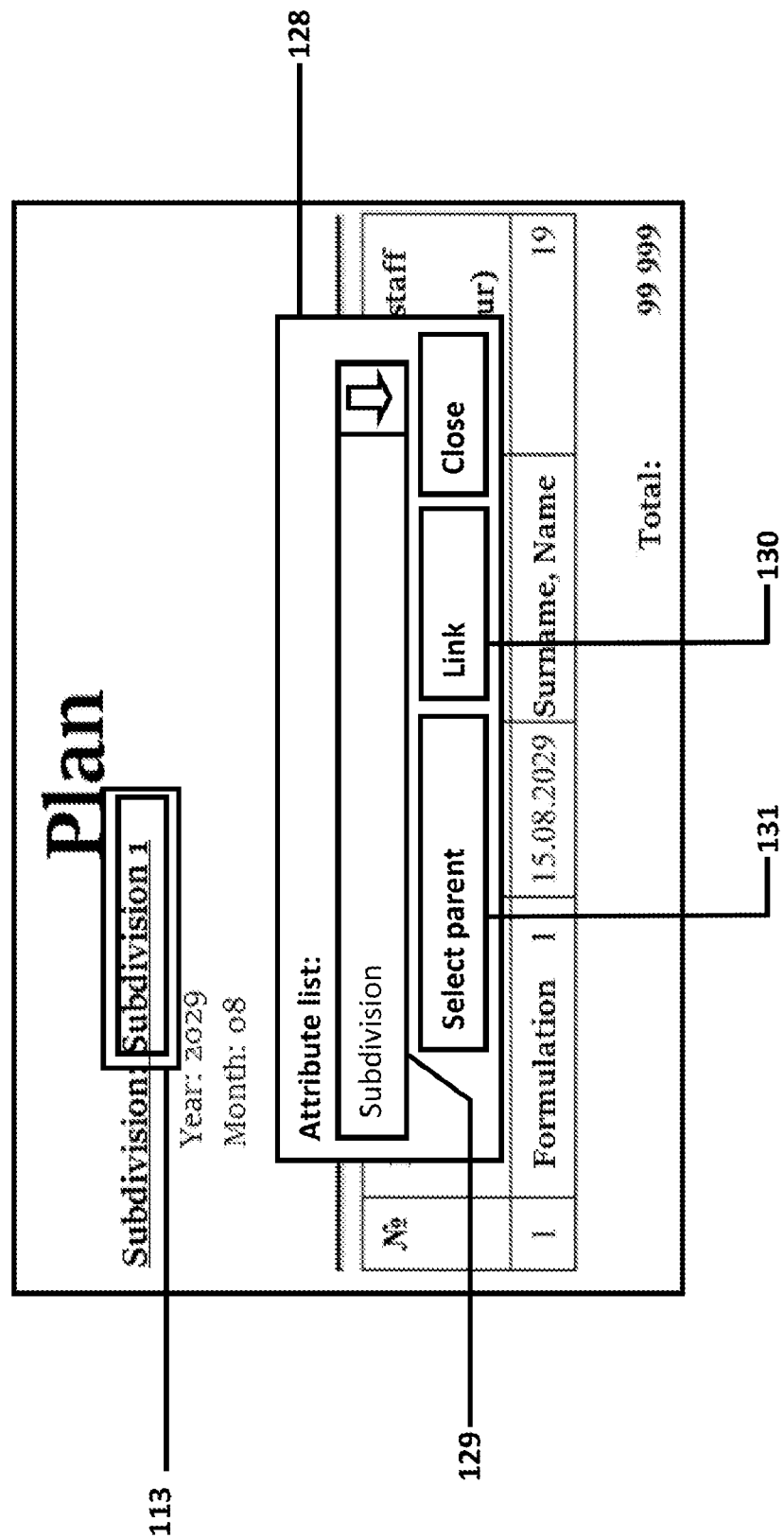
Figure 8:
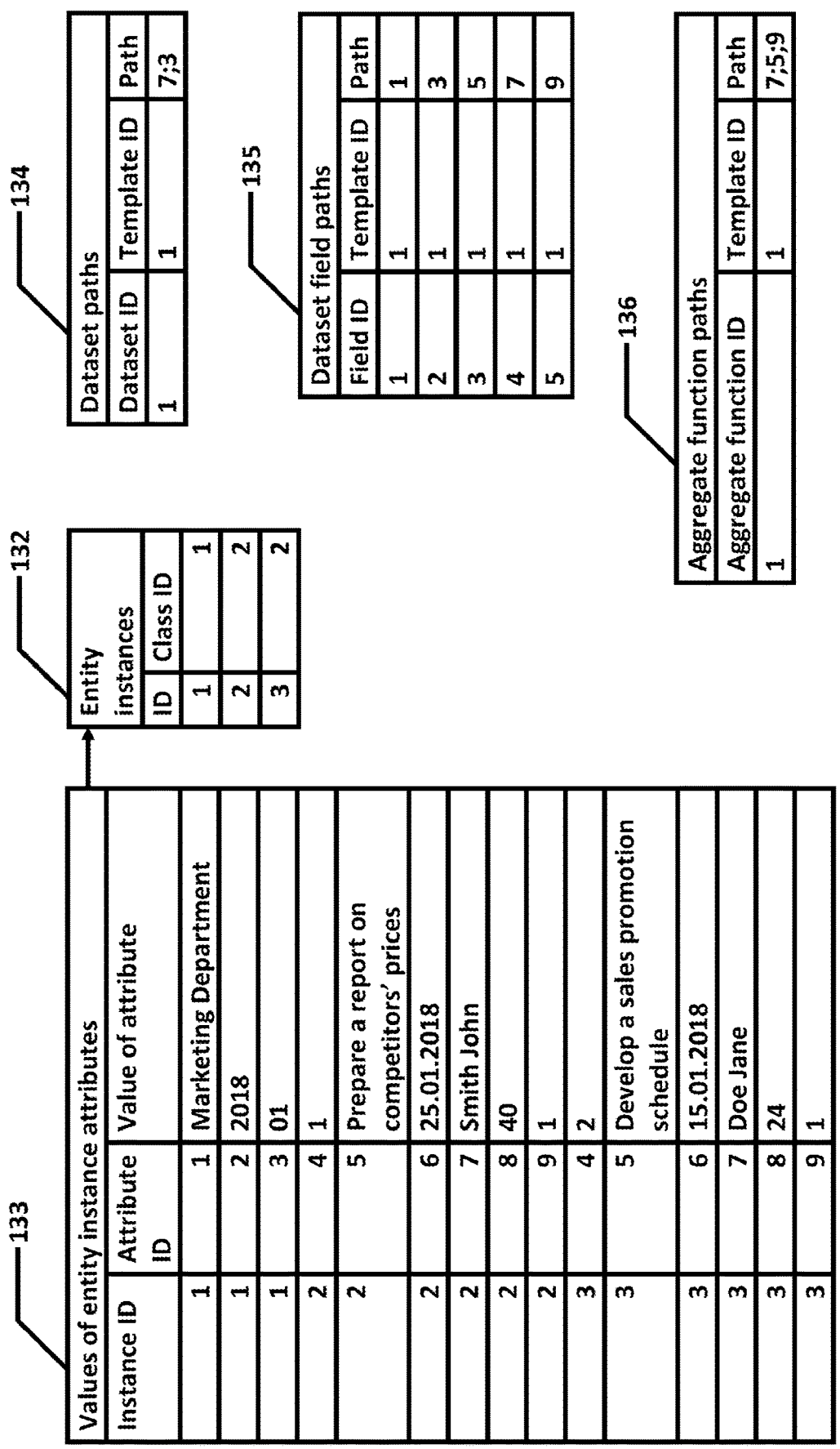

FIG. 7 depicts a visual representation of the abridged fragment of one of possible variants of a template written in HTML, the fragment depicted in FIG. 3, in mode of forming and storing links between template elements and entity class attributes, datasets, their fields and aggregate functions; there are indicated:

the element 113 selected by the user and marked graphically (by a solid line frame);

a dialog window 128, the window includes a list 129 of entity class attributes available for forming links; a button 130 intended for starting the procedure of forming and storing links; a button 131 for selecting an element being a parent element for the current selected element;

FIG. 8 depicts a fragment of a possible DB structure with an indication of an attribute content of tables, an approximate content of tables and links between the displayed tables (as arrows) and there are depicted:

an entity instance table 132; a link between an entity instance from the table 132 and an entity class from the table 100 depicted in FIG. 1 is provided by storing a value of an entity class identifier within entity instance data (in the "Class ID" attribute in the table 132);

an entity instance attribute value table 133; a link between an attribute value from the table 133 and an entity instance from the table 132 is provided by storing a value of an entity instance identifier within entity attribute data (in the "Instance ID" attribute in the table 133); a link between an attribute value from the table 133 and an entity class from the table 100 depicted in FIG. 1 is provided by storing a value of an entity class identifier within entity attribute value data (in the "Attribute ID" attribute in the table 133);

a table 134 with dataset paths wherein paths (as strings including digital representations of numerical values of child element indexes placed from left to right and separated by a semicolon symbol) from a template root element to a root element of a template element group intended to display dataset elements; a link between a dataset path from the table 134 and a dataset from the table 102 depicted in FIG. 1 is provided by storing a value of a dataset identifier within the dataset path data (in the "Dataset ID" attribute of the table 134); a link between a dataset path from the table 134 and an entity representation template from the table 120 depicted in FIG. 5 is provided by storing a value of an entity representation template identifier within dataset path data (in the "Template ID" attribute of the table 134);

a table 135 with dataset field paths wherein paths (as strings including digital representations of numerical values of child element indexes placed from left to right and separated by a semicolon symbol) from a root element of the template element group intended to display dataset elements to target elements of the group; a link between a dataset field path from the table 135 and a dataset from the table 102 depicted in FIG. 1 is provided by storing a value of a dataset identifier within the dataset path data (in the "Field ID" attribute of the table 135); a link between a dataset field path from the table 135 and an entity instance representation template from the table 120 depicted in FIG. 5 is provided by storing a value of an entity instance representation template identifier within the dataset field path data (in the "Template ID" attribute of the table 135);

a table 136 with dataset aggregate function paths wherein paths (as strings including digital representations of numerical values of child element indexes placed from left to right and separated by a semicolon symbol) from a template root element to a root element intended to represent values of dataset aggregate function; a link between a dataset aggregate function path from the table 136 and a dataset aggregate function from the table 104 depicted in FIG. 1 is provided by storing a value of a dataset aggregate function identifier within the dataset aggregate function path data (in the "Aggregate function ID" attribute of the table 136); a link between a dataset aggregate function path from the table 136 and an entity representation template from the table 120 depicted in FIG. 5 is provided by storing a value of an entity representation template identifier within dataset aggregate function path data (in the "Template ID" attribute in the table 136).

FIG. 9 depicts examples of possible variants of inserting into a template element for enabling a program code library, the program code effects representation of the entity instance and datasets in the template and provides user with an opportunity to edit values of entity attributes and store changed values in the DB (in case the template is written in HTML and the program code of the library is written in JavaScript). In FIG. 9 there are indicated:

an example 137 of a simplified template of an entity representation in HTML with an element 138 inserted by the server, the element 138 enables the program code library located in an external file named "edit_library";

an element 139 inserted by the server, the element 139 enables the "prepare_for_edit" procedure call for representation entity instance and preparing instance attribute values for editing after finishing loading the template by the browser;

an example 140 of a simplified template of an entity representation in HTML with an element 141 inserted by the server, the element 141 includes the program code of the library itself and, after finishing loading the template by the browser, provides "prepare_for_edit" procedure call for representation entity instance and preparing instance attribute values for editing;

an entity instance identifier 142 which will be represented in the browser for previewing and editing by the user.

FIG. 10 depicts an example of an object (as a program code written in JavaScript language for object generation) for storing in the browser memory data and metadata of the entity instance and datasets wherein there are indicated:

a feature 143 wherein the value of the entity class identifier is stored;

an array 144 wherein matched entity attribute identifiers, values of the entity instance attributes, and paths to target template elements for representing of the values of the entity instance attributes are stored; an object array 145 wherein data and metadata of datasets are stored, such as: a feature 146 wherein dataset paths wherein paths (as strings including digital representations of numerical values of child element indexes placed from left to right and separated by a semicolon symbol) from a root element of the template to a root element of the template element group intended to display dataset elements; a path array 147 (as strings including digital representations of numerical values of child element indexes placed from left to right and separated by a semicolon symbol) from the root element of the template element group intended to display dataset elements to target elements of the group; an array 148 wherein rows of a table part of the dataset (as dataset element value arrays) are stored; an object array 149 wherein matched values of dataset aggregate functions and paths to target template elements for presenting these values are stored.

FIG. 11 depicts function examples in JavaScript, intended for presenting entity instance and datasets in the template in the browser. In FIG. 11 there are depicted:

an auxiliary function 150 which takes a DOM root element and a path (from this root element) as parameters and returns the DOM element found following the path in correspondence with the root element;

a function 151 which places values of entity instance attributes into corresponding template elements;

a function 152 which places values of dataset aggregate functions into corresponding template elements.

FIG. 12 depicts an example of a function 153 which places dataset table parts in the template.

FIG. 13 depicts a visual representation, by the browser, of an exemplary template with entity instance attribute values, dataset elements and the aggregate function value placed within the template and corresponding to the exemplary object in the browser memory depicted in FIG. 10 and to an exemplary possible composition of data and metadata depicted in FIG. 1, FIG. 5, and FIG. 8.

Figure 14:
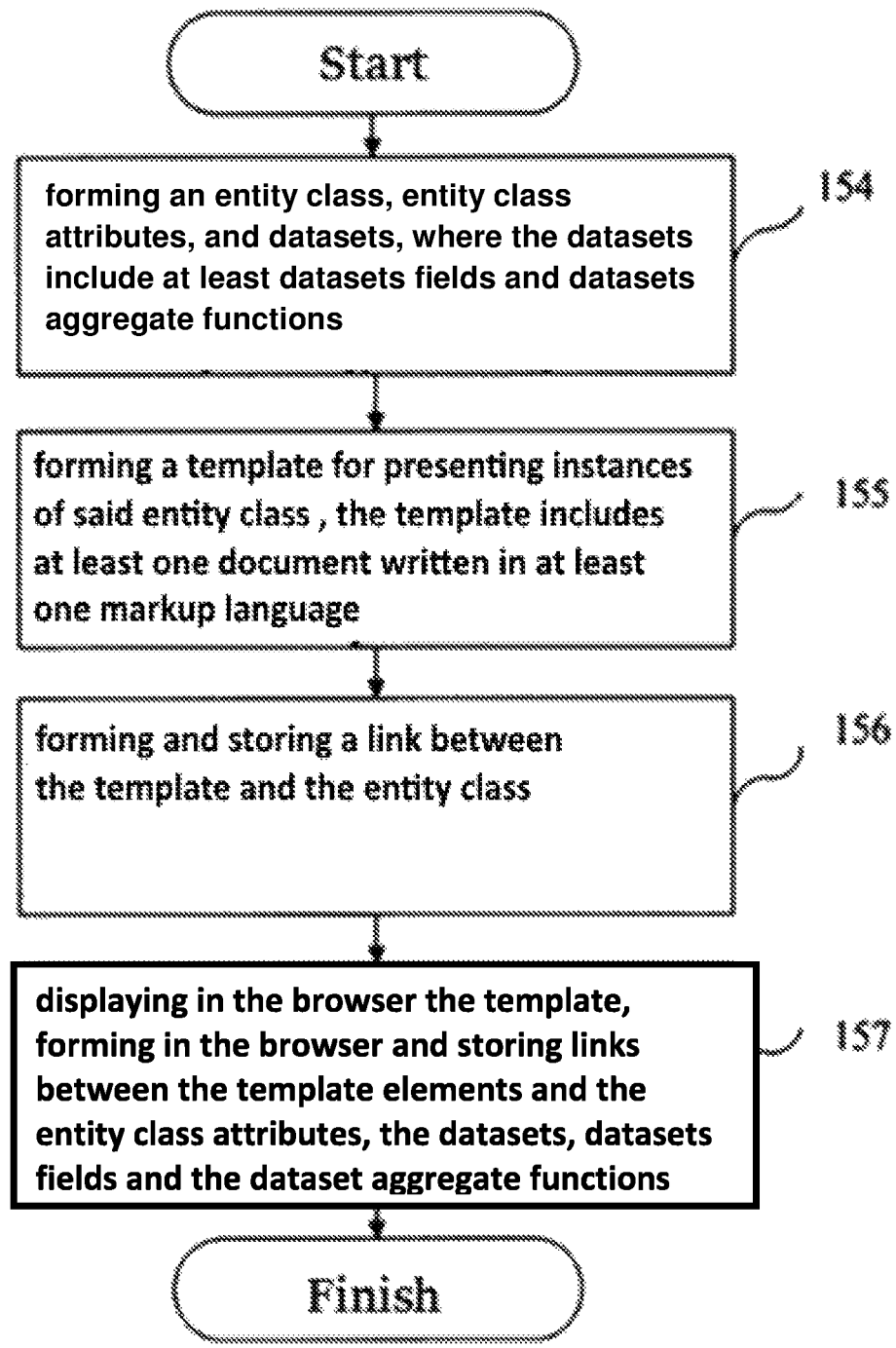

FIG. 14 depicts a block diagram showing an implementation variant of the method for preparing documents written in markup languages while implementing a user interface for dealing with data of an information system.

DETAILED DESCRIPTION

Exemplary terms and denominations presented here are intended to be only illustrative examples of the present technical solution are not intended to identify key or critical elements of the present technical solution.

Merely for the purposes of ease of illustration, in the present description HTML markup language is used as an example, however as a person skilled in the art would appreciate, the present method can be implemented using any other markup language which can be supported by browsers and provides a possibility of hierarchic structure of markup elements and data within the document written in this language. Such languages may be, for example, some applications and subsets of SGML meta language.

The present technical solution may be implemented on a computer and as a computer system or a storage media containing instructions for implementing said method.

The present technical solution may be implemented in a distributed computer system.

Terms and their descriptions necessary for understanding the present technical solution are shown below.

Data is reinterpretable representation of information in a formalized manner suitable for communication, interpretation, or processing (ISO/IEC 2382:2015, 2121272 <<data>>);

Data element is a unit of data that is considered in context to be indivisible>>) (ISO/IEC 2382:2015, 2121599 (<<data element>>);

Database (DB) is a collection of data organized according to a conceptual structure describing the characteristics of these data and the relationships among their corresponding entities, supporting one or more application areas (ISO/IEC 2382:2015, 2121413 <<database>>);

Metadata is data about data or a data element possibly including data descriptions and data about data ownership, access paths, and data volatility (ISO/IEC 2382:2015, 2121505 <<metadata>>);

Server is a functional block in a computer network, the block that provides services for working stations, personal computers, or other functional blocks (ISO/IEC 2383:2015, 2120558 <<server>>); the functional block that provides common services for working stations or other functional blocks via a communication network (ISO/IEC 2383:2015, 2124462 <<server>>);

Web browser is application program software for browsing web pages; in the context of the present specification, unless expressly provided otherwise, the web browser is intended to mean any software providing to a user an interface for dealing with documents written in markup languages and the ability to implement program code written in script languages such as, for example, but without being limitative, JavaScript or Dart;

ORM (Object-Relational Mapping) is a programming technology that links databases with conceptions of object-oriented languages and allows dealing with data as objects using DB managing system of any type for which there is a corresponding ORM library;

XPath (XML PathLanguage) is a language for addressing parts of an XML document, designed to be used by both XSLT and XPointer (http://www.w3.org/TR/1999/REC-xpath-19991116/);

SGML (Standard Generalized Markup Language) is a metalanguage that allows defining a markup language for documents (ISO 8879:1986, <<Standard Generalized Markup Language>>);

Entity is any particular or abstract thing that exists, existed or could have existed including a combination of such objects (ISO/IEC 2382:2015, 2121433 <<entity>>);

Attribute is a named characteristic (property) of an entity (ISO/IEC 2382:2015, 2121440 <<attribute>>);

Entity class is a plurality of entities with a common attributes (ISO/IEC 2382:2015, 2121438 <<entity class>>);

Entity instance (entity class instance) is a particular entity of a given entity class (ISO/IEC 2382:2015, 2121439 <<entity occurrence>>)

Attribute value is a particular occurrence of an attribute (ISO/IEC 2382:2015, 2121441 <<attribute value>>);

Dataset is a finite plurality of data elements organized as a particular structure, metadata of the structure provide a possibility for identifying, interpreting and processing of each data element from the plurality; in the context of the present specification, unless expressly provided otherwise, a dataset is regarded as a result of request to a database, the result include attribute values of several instances of one or several entity classes as well as derivative values of the attribute values (for example, aggregate function values) and may include any additional data elements; at least a part of the dataset may be represented as a table, an in such a table each separate row includes logically related data items, for example, attribute values of one particular entity class instances or attribute values of matched instances of entities of different particular classes and each column includes homogeneous data, for example, values of a particular attribute of each instance of an entity of a particular class represented in the dataset. Such table is called "table part" of a dataset or a "table" of a dataset.

Field (of a dataset) is metadata of a dataset column that are used for identification, interpreting and processing of data of this column; the field of the dataset includes an identifier that is used for retrieving other field metadata needed for dealing with the data of the column;

Template (representations of an entity class instance) is a document written in a markup language including existing on machine-readable media that can be used while implementing a user interface for dealing with several instances of one or several entity classes;

Template element is the smallest indivisible structure template element (for example, HTML tag).

Template type is a metadata element of a template, the template type indicates intended use of the template, for example, "for printing", "for the physically challenged" etc.; templates of different types can be different in structure and appearance; templates intended to represent entities in different user languages can also be different in structure and appearance;

DOM (Document Object Model) is a platform- and language-neutral interface that will allow programs and scripts to dynamically access and update the content, structure and style of documents. (http://www.w3.org/DOM/);

AJAX (Asynchronous Javascript and XML) is a concept of building user interfaces of web-applications, the concept is a "background" data communication between a browser and a web-server. As a result, during data refreshing a web-page is not fully downloaded and web-applications become faster and more convenient.

Drag-and-Drop is a method of operating interface elements in user interfaces using a mouse manipulator or another pointer;

Distributed computer system is a set of independent computers (computer devices) regarded by their users as a single combined system;

Command processing device is an electronic block or an integrated circuit (microprocessor) executing computer instructions (programs).

Command processing device reads and executes computer instructions (programs) from one or more data storage devices. Data storage devices are, for example, but without being limitative, HDD, flash memory, ROM, SSD.

Program is a sequence of instructions intended to be executed by a control device of a computer or a command processing device.

According to a method for preparing documents written in markup languages while implementing a user interface for dealing with data of an information system: forming of metadata for at least one entity class, their attributes, datasets, and dataset elements including at least dataset fields and dataset aggregate functions;

Entity class metadata and their attributes have to include identifiers, the identifiers allow to distinguish classes and to distinguish attributes (at least within corresponding classes) and the identifiers may include names, descriptions and other elements. FIG. 1 depicts one of possible variants of a structure and content of the entity class metadata (the table 100) and its attributes (table 101).

Dataset metadata, its fields and aggregate functions must include identifiers allowing to distinguish datasets and to distinguish fields and aggregate functions (at least within corresponding datasets) and the identifiers may include other elements intended to form datasets. Dataset links are formed additionally with entity classes which instance representation are needed to insert elements of these datasets. FIG. 1 depicts one of possible variants of a structure and content of the entity class metadata (the table 102), its fields (the table 103) and aggregate functions (the table 104) and a structure and content of links of the datasets with the entity classes.

forming a template for presenting instances of said entity class, the template includes at least one document written in at least one markup language;

In some implementations, the markup language is, for example, but without being limitative, HTML, or XML, or XHTML, or DocBook.

In some implementations, documents written in markup languages are formed using software suitable for the markup languages used including, but without being limitative, text editors with syntax highlight, or WYSIWYG-editors including online editors.

In templates for representation of entity class instances elements are generated, the elements will represent entity class instance attribute values, and auxiliary elements are generated including (without being limitative) descriptions, background images, dividing lines and other elements.

In some implementations, values for template elements, the template elements are intended to present values of entity class instance attributes, are established using data types and sizes corresponding to the entity class attributes.

In some implementations, values for template elements, the template elements are intended to present values of dataset elements, are established using data types and sizes corresponding to the dataset elements.

In some implementations, in the template for presenting entity class instances, elements for presenting dataset elements are further formed to preset dataset elements, for example, including entity instance attribute values associated with the presented entity instance, as well as aggregate functions values calculated based on the values of these attributes. Generally, an amount of rows in table parts of the datasets is not known during forming entity instance presentation table. Therefore, in the template a group of elements is formed, the group is big enough to present needed elements of one dataset row. In the process of representing the entity instance copies of this group of elements are generated to present elements of other dataset rows. One of variants of copying template group of elements, the variant that allows to simplify implementation is the one that uses a possibility provided by DOM to generate copies of fragments of the document hierarchy structure. To use this possibility, in some implementations of the present technology, in the template a structure element is generated, the structure element is a root element of the fragment of the document hierarchy structure, the root element includes all the elements of said group. FIG. 2 depicts an example of a process of copying a fragment of a hierarchic structure of a document written in HTML using a program code written in JavaScript programming language. It must be emphasized that an ID attribute of the element 108 in the fragment 105 depicted in FIG. 2 is used merely for the purposes of ease of illustration of the example due to the simplifies program code 107. In the present technical solution using the ID attribute is not necessary, which will be apparent from the following description. FIG. 3 depicts the abridged fragment of one of possible variants of the template written in HTML to present the "plan" entity instance; the "plan" entity instance has to include attribute values of the "task" entity instance associated with it as well as aggregate function values, the aggregate function calculated based on one of these attributes. FIG. 4 depicts the visual representation, by the browser, of the abridged template fragment depicted in FIG. 3.

In some implementations, the formed template is stored on a server in a database.

forming and storing a link between the template and the entity class;

In some implementations, forming a link between a template and an entity class is provided by user's actions, the user selects the entity class from a set received from the server, selects a template (a file, a WYSIWYG editor, but without being limitative) and by these actions the user forms the link between the template and the entity class.

In some implementations, the information about the formed link is stored on the server in the DB. FIG. 5 depicts one of possible variants of storing the link between the template and the entity class: the link between a template from the table 120 and an entity class from the table 100 is provided by storing the value of the entity class identifier within the template metadata, in the "Class ID" attribute in the table 120.

In some implementations, within the information about the formed link between the template and an entity class, a template type identifier (for example, intended to indicate its purpose: "for printing", "for touch-screen devices", "for the physically challenged" etc.) and a user language identifier are further stored, said language being used for forming values of auxiliary elements of the template (for example, text descriptions or images containing text).

displaying the template, forming and storing links between the template elements and entity class attributes, datasets, datasets fields and datasets aggregate functions, in the meantime: selecting a template element and information about entity class attributes, datasets, datasets fields and datasets aggregate functions available for link forming is displayed; selecting an entity class attribute, or a dataset, or a dataset field, or a dataset aggregate function;

forming and storing a link including an identifier of the template element selected previously and an identifier of the entity class attribute, or the dataset, or the dataset field, or the dataset aggregate function selected previously.

User's actions may be effected in the browser and it allows to work remotely, for example, via Internet.

In some implementations, to retrieve the template for forming and storing links of template elements with entity class attributes, datasets, their fields and aggregate functions, the user initiates retrieving the template in the browser, the browser requests the template from the server. The server retrieves the template from the database and inserts into the template the element enabling the program code library, the code intended to provide the user with the opportunity to form and store links between the template elements and entity class attributes, datasets, datasets fields and datasets aggregate functions, the server also inserts into the template the element with the entity class identifier using information about the link between the template and the entity class, the information formed and stored in the DB on the previous step; afterwards the server sends the template to the browser for displaying. FIG. 6 depicts the example 122 of the simplified template of the entity representation with the element 123 inserted by the server, the element enables the program code library located in the external file named "markup_library" and with the element 124 inserted by the server, the element includes the entity class identifier 127.

In some implementations, the server retrieves the template from the database and inserts into the template the element including the following: the program code intended to provide the user with the opportunity to form and store links between the template elements and entity class attributes, datasets, their fields and aggregate functions; the entity class identifier, using information about the link between the template and the entity class, the information formed and stored in the DB on the previous step; afterwards the server sends the template to the browser for displaying. FIG. 6 depicts the example 125 of the simplified template of the entity representation with an element 126 inserted by the server, the element 126 includes the program code of the library and the identifier 127 of the entity class.

In some implementations, the program code intended to provide the user with the opportunity to form and store links between the template elements and entity class attributes, datasets, their fields and aggregate functions, is implemented in any programming language supported by the browser such as, for example, but without being limitative, JavaScript or Dart.

In some implementations, the library of the program code intended to provide the user with the opportunity to form and store links between the template elements and entity class attributes, datasets, their fields and aggregate functions, is located on the remote server available via the Internet.

In some implementations, when the user places the cursor (or any other pointer) on a template element, this element is marked graphically for ease of selecting the element for forming the link between the element and an entity class attribute, or a dataset, or a dataset field, or a dataset aggregate function.

In some implementations, when the user selects the template element, the information about entity class attributes, datasets, their fields and aggregate functions available for forming links, the information being located on the remote server, is displayed. FIG. 7 depicts a visual representation of the abridged fragment of one of possible variants of a template written in HTML, the fragment depicted in FIG. 3, in mode of forming and storing links between template elements and entity class attributes, datasets, their fields and aggregate functions.

In some implementations, the information about entity class attributes, datasets, their fields and aggregate functions available for forming links, is displayed as lists, the lists include only available attributes, datasets, their fields and aggregate functions, the attributes, datasets, their fields and aggregate functions not yet associated with any template element.

In some implementations, the information about entity class attributes, datasets, their fields and aggregate functions available for forming links, is displayed in a separate browser window or in a movable area within a window with the template and forming links with template elements is effected using the Drag-and-Drop technique.

In some implementations, while selecting a template element when the displayed area of the template element to be selected is fully covered with displayed areas of child elements and the parent element cannot be selected, any child element is selected and, further, parent elements are selected successively until the required element is selected to form a link with an entity class attribute, or a dataset, or a dataset field or a dataset aggregate function. Selecting a successive parent element is effected using a control element (for example, a button) displayed along with lists of entity class attributes, datasets, their fields and aggregate functions available for forming the link. FIG. 7 depicts a button 131 for selecting an element being a parent element for the present selected element.

In some implementations, selecting the entity class attribute, or the dataset, or the dataset field or the dataset aggregate function is effected to form and store the link between the template element selected previously.

In some implementations, selecting the link of the entity class attribute, or the dataset, or the dataset field or the dataset aggregate function is effected and then forming and storing the link with the template element selected previously using the control element (for example, the button) displayed along with lists of entity class attributes, datasets, their fields and aggregate functions available for forming a link. FIG. 7 depicts the button 130, the button 130 intended for starting the procedure of forming and storing the link.

In some implementations, the information about the formed and stored link includes an identifier of the entity class attribute, or a dataset, or a dataset field, or a dataset aggregate function and a template element identifier. "Template element identifier" is intended to mean data/metadata element/metadata allowing the programming code executed by the browser to access the given template element.

To deal with a document written in a markup language the browser builds in the memory an internal representation of the document and provides the program code implemented by the browser with the access to said representation as DOM; to effect that the browser reproduces in the memory the document tag hierarchy. In DOM, each element, except for the root element, has its single direct "parent" (a higher level element); a link to the parent element is stored within the element itself (parentNode for HTML and JavaScript), and all elements can have several "children" (lower level elements) and in this case each such element has a special array of links to child elements (childNodes for HTML and JavaScript). Each link in the array has a sequential number (index). Thus, for each template element, by referring to direct "parents", a unique sequence of child element indexes can be determined, the sequence goes from the root element (or another known element) to the given element. In the context of the present specification, in some cases, to abbreviate, this sequence will be referred to as "a path" (to an element).

In some implementations, in case of using templates written in HTML, the BODY element is used as the root element.

In some implementations, while forming a link between a template element and an entity class attribute or a dataset aggregate function, a path from the DOM root element to the template element is used as a template element identifier. While forming a link between a dataset and a template element that is a root element for a group of elements intended to display dataset elements, a path from the DOM root element to the template element is also used. While forming links between the element of said group with dataset fields, paths to these element from the root element of the group are used as identifiers of the elements of the group. For example, a path to the element 113 depicted in FIG. 3 from the BODY element is the following sequence of child element indexes (from left to right): 3, 1, 3. As a person skilled in the art would understand, such values of the child element indexes are based on a standard method of parsing, by the browser, the source HTML text, wherein auxiliary symbols used for source text formatting (for example, a line feed, a carriage return, spaces) are placed, by the browser, into separate text nodes which also are DOM elements and are a part of arrays of child elements (childNodes) of corresponding higher level elements; indexes starting from zero.

In some implementations, an ID attribute value of the given template element is used as a template element identifier.

In some implementations, ID attribute values unique for a template are established for all template elements automatically after forming a link between the template and an entity class.

In some implementations, an ID attribute value unique for a template is established for a template element automatically during forming a link between this element and an entity class attribute, or a dataset, or a dataset field or a dataset aggregate function.

In some implementations, an expression for a request, the expression written in XPath language is used as a template element identifier.

In some implementations, a unique value of the element is used as a template element identifier.

In some implementations, to retrieve template elements identifiers XPath request language is used.

In some implementations, after forming the link between the template element and the entity class attribute, or the dataset, or the dataset field or the dataset aggregate function this element is marked graphically.

In some implementations, the formed links of template elements with entity class attributes, datasets, their fields and aggregate functions are stored on the server in the database.

In some implementations, paths to template elements are stored as strings including digital representations of numerical values of indexes placed from left to right or from right to left and separated by a special symbol or a group of symbols. Thus, in the table 121 depicted in FIG. 5, the path to the element 113 depicted in FIG. 3 from the BODY element is stored as a "3; 1; 3" string. In the table 136 depicted in FIG. 8, the path to the element 118 depicted in FIG. 3 from the BODY element is stored as a "7; 5; 9" string. In the table 134 depicted in FIG. 8, the path to the element 115 depicted in FIG. 3 from the BODY element is stored as a "7; 3" string. In the table 135 depicted in FIG. 8, the path to the element 116 depicted in FIG. 3 from the element 115 is stored as a "3" string.

As a person skilled in the art would understand, any known DB type can be used as the DB. For example, it may be hierarchical, network, SQL and object-oriented DB.

The results of the method for preparing documents written in markup languages while implementing a user interface for dealing with data of an information system may be used (without being limitative) as follows:

a template for presenting entity class instance is obtained;

The user initiates in the browser a request to the server for editing the entity class instance. The browser sends an identifier of the entity class instance within the request. Using the identifier of the entity class instance the server refers to the DB and retrieves from the table 132 the identifier of the entity class and uses it to retrieve metadata of the template for presenting entity class instance from the table 120 including template file name. The server inserts into the template the element enabling the program code library, the library provides receiving, by the browser, (on the next step of the method) necessary data and metadata (values of entity class instance attributes, datasets and values of aggregate functions as well as metadata of entity class attributes, metadata of datasets and their fields and aggregate functions including information about links between template elements and entity class instance attributes, datasets, their fields and aggregate functions) and location of received data in the template elements; the library also provides the user with a possibility to edit values of entity class instance attributes in the browser and store the changed value in the DB; the server further inserts into the template the element with an identifier of the entity class instance; afterwards the server sends the template to the browser for displaying. FIG. 9 depicts an example 137 of a variant of inserting into the template the element for enabling a program code library and inserting the identifier of the entity class instance, in case the library is located in an external file.

In some implementations, the server inserts into the template the program code of the library. FIG. 9 depicts an example 140 of a variant of inserting into the template the element for enabling a program code library and inserting the identifier of the entity class instance, in case the server inserts into the template the program code of the library. The library may be implemented in any programming language supported by the browser, including (but without being limitative) JavaScript or Dart.

In some implementations, the external library may be located on a remote server available via the Internet.

Data and metadata of the entity instance, datasets and their fields and aggregate functions including the information about links between template elements and entity class instance attributes, datasets, their fields and aggregate functions are received;

In some implementations, receiving the data and metadata of the entity instance, datasets and their fields and aggregate functions is effected via AJAX. Possible DB structure and exemplary possible compositions of data and metadata are depicted in FIG. 1, FIG. 5, and FIG. 8. In some implementations, the data and metadata received from the DB are stored in the browser memory within the object;

the program code of the library enabled on the previous step refers to that object. FIG. 10 depicts an example of the object (as a program code written in JavaScript language for object generation) for storing in the browser memory the data and metadata of the entity instances, datasets and their fields and aggregate functions including the information about links between template elements and entity class instance attributes, datasets, their fields and aggregate functions. The composition of the data and metadata depicted in FIG. 10 within the exemplary object is corresponding the exemplary possible composition of the data and metadata depicted in FIG. 1, FIG. 5, and FIG. 8;

the entity instance is depicted.

In some implementations, the program code of the library enabled previously uses the object placed into the browser memory on the previous step, the object has the data and metadata of the entity instances, datasets and their fields and aggregate functions to place the data within the template elements. For example: the function 151 depicted in FIG. 11 refers to the array 144 of objects in a loop fashion (matched identifiers of entity attributes, values of entity instance attributes and paths to template elements for representing values of entity class instance attributes are stored within the objects) and, using the auxiliary function 150, finds the template elements and then places the values of entity class instance attributes into them; the function 152 depicted in FIG. 11 refers to the array 145 of datasets in a loop fashion, then the function 152 to the array 149 of objects in a nested loop fashion (matched values of dataset aggregate functions and paths to the template elements for representing these values are stored within the objects) and then places the values of dataset aggregate functions into them; the function 153 depicted in FIG. 12 refers to the array 145 of datasets in a loop fashion and, using the auxiliary function 150, finds the template elements and then places the values of dataset aggregate functions into them; the function 153 depicted in FIG. 12 refers to the array 145 of datasets in a loop fashion and, using a value of the path to the root element of the group of template elements intended to represent row data of the table part of the dataset, the value is stored in the feature 146, and the auxiliary function 150, finds the root element, then, in a nested loop fashion, refers to the array 148 of rows of the table part of the dataset and, if required, in the template structure, generates an additional copy of the group of the template elements for presenting the rows of the table part of the dataset, and then, in a loop fashion, using the array of the values of the dataset elements, places these values into the group elements using values of the paths from the root element to the elements, the values are stored in the array 147. FIG. 13 depicts a visual representation, by the browser, of an exemplary template with entity instance attribute values, dataset elements and the aggregate function value placed within the template and corresponding to the exemplary object in the browser memory depicted in FIG. 10 and to an exemplary possible composition of data and metadata depicted in FIG. 1, FIG. 5, and FIG. 8.

In some implementations, paths to template elements are used only for the primary search. Then, temporary synthetic identifiers (using an ID attribute) are attributed for these elements to shorten the time of referring to the elements due to using the possibility of the element search using a value of the ID attribute; such possibility is provided by DOM.

editing an entity class instance;

Editing the entity class instance is changing values of attributes of the entity class instance in its representation in the browser.

In some implementations, in case of using templates written in HTML, a possibility to change the values of the attributes of the entity class instance in the WYSIWYG mode is used, for that purpose, after placing the values of the attributes of the entity class instance into the template elements, the program code of the library enabled previously, further establishes the value TRUE of the attribute CONTENTEDITABLE for these elements.

In some implementations, changing the values of the attributes of the entity class instance is effected using a dialog window, the window appears when the user selects the corresponding template element.

In some implementations, to ease dealing with changes of the values of the attributes of the entity class instance for the user, the template elements that include the values available for changing are marked graphically.

In some implementations, to ease dealing with changes of the values of the attributes of the entity class instance for the user, the template elements that include the values changed by the user are marked graphically;

storing the changed entity class instance.

The user initiates in the browser the procedure of storing the changed entity class instance, the entity is a part of the program code library enabled previously. Using the data and metadata of the entity instance and its attributes (for example within an object, such as the exemplary object depicted in FIG. 10) stored in the browser memory, this procedure finds the template elements that have the values of the attributes of the entity class instance, reads these values and requests the server to store these values.

In some implementations, the request to the server is effected using AJAX.

In some implementations, the request to the server includes only changed values of the attributes of the entity class instance, for that purpose the procedure that forms the request compares the values of the attributes of the entity class instance that are located in the template elements with the values of the attributes of the entity class instance that were received from the server and that are stored in the browser memory (for example, within an object, such as the object depicted in FIG. 10).

The server processes the request and stores the values of the attributes of the entity class instance in the DB.

In some implementations, storing the values of the attributes of the entity class instance in the DB is effected using ORM.

The figures depict one of implementations of the present technology.

This detailed description is written using different non-limitative and non-exhaustive implementations. As a person skilled in the art would understand, different changes, modifications and combinations of any described implementations (fully or partially) may be effected within the scope of the present technical solution. Thus, it is intended to mean that the present description includes additional implementations that are not explicitly set forth. Such implementations may be obtained by, for example, combination, modification and transformation of any actions, components, elements, features, aspects, characteristics etc. associated with the non-limitative implementations described here.

The invention claimed is:

1. A method of preparing documents written in markup languages during implementing a user interface for dealing with data of an information system, the method comprising:
   forming an entity class;
   forming attributes and datasets for the formed entity class, wherein each of the formed entity class datasets includes at least dataset fields and dataset aggregate functions;
   wherein at least one of the formed entity class datasets is represented at least partly as a table having at least two rows and at least five columns,
   wherein each of the rows in the table includes logically related data items, and each of the columns in the table includes homogeneous data;
   forming a template for presenting more than one instance of said formed entity class, the template including at least one document written in at least one markup language, wherein the formed template comprises template elements and is stored separately from data of said instances of said entity class, wherein the formed template is stored on a server in a database;
   forming a link between the formed template and the formed entity class and storing the formed link between the formed template and the formed entity class in the database;
   displaying, in the browser, the template, and forming in the browser links between the template elements and the entity class attributes, the datasets, the dataset fields, and the dataset aggregate functions, and storing links between template elements and the entity class attributes, the datasets, the dataset fields, and the dataset aggregate functions, comprising:
      selecting, in the browser, at least one of the template elements;
      automatically generating an identifier for the selected template element, allowing a program code executed by the browser to access the template element through the use of the generated identifier;
      displaying, in the browser, the entity class attributes, the entity class datasets, the dataset fields and the dataset aggregate functions available for link forming;
      selecting, in the browser, at least one of the entity class attributes, the entity class datasets, the dataset fields, and the dataset aggregate functions;
      automatically forming, in the browser, a link comprising the generated identifier for the selected template element and a particular identifier for at least one of the selected entity class attributes, the entity class datasets, the dataset fields, and the dataset aggregate functions; and
      storing the automatically formed link comprising the generated identifier for the selected template element and the particular identifier for the at least one of the selected entity class attributes, the entity class datasets, the dataset fields, and the dataset aggregate functions;
   wherein the formed template further comprises a group of elements, the group for presenting data of one dataset row, and the method further comprises forming a structural element in the formed template, wherein the structural element is a root element of a fragment of the template hierarchic structure, the root element including all elements of said group of elements, to allow copying in the browser the fragment of the template hierarchic structure and, thus, the group of elements in order to present elements of the remaining dataset rows when presenting an entity class instance,
   wherein prior to presenting the entity class instance, the server identifies the entity class and, by using the formed link between the entity class and the template, retrieves the template from the database and inserts into the template the following elements: an element comprising an identifier of the entity class instance; and an element enabling a program code library or comprising the program code, the program code allowing the browser to receive from the database information comprising values of the entity class instance attributes, datasets, including the rows of the datasets and values of the dataset aggregate functions, and the automatically formed links between the template elements and entity class attributes, datasets, dataset fields and the dataset aggregate functions,
   wherein said information received from the database is stored within an object in a memory of the browser,
   wherein the program code of the element inserted into the template uses the object stored in the browser memory to place the information within the template elements to represent the entity class instance,
   wherein the program code uses the automatically formed links between the template elements and entity class attributes to place the values of the entity class instance attributes within the template elements,
   wherein the program code uses the automatically formed links between the dataset aggregate functions and the template elements to place the values of the dataset aggregate functions within the template elements,
   wherein to place the datasets within the template elements the program code uses the automatically formed links between the datasets and the template elements which are said root elements for document hierarchic structure fragments comprising the groups of elements, the groups for presenting data of one dataset row, wherein the program code further copies the fragments of the document hierarchic structure for each presented dataset row and places, in the fragment copies, values of fields of the presented dataset row by using the automatically formed links between the dataset fields and the template elements.

2. The method of claim 1, wherein datasets include attribute values and aggregate function values calculated based on the attribute values, the entity class attributes belong to entity instances associated with an entity instance being presented.

3. The method of claim 1, wherein the markup language is HTML, or XML, or XHTML, or DocBook.

4. The method of claim 1, wherein the template is formed using text editors with syntax highlight, or WYSIWYG-editors, or online editors.

5. The method of claim 1, wherein values of template elements which present values of entity class attributes are established using data types and sizes corresponding to the entity class attributes.

6. The method of claim 1, wherein values of template elements which present values of the datasets are established using data types and sizes corresponding to the datasets.

7. The method of claim 1, wherein information about the formed link between the template and an entity class is stored on a server in a database.

8. The method of claim 1, wherein within information about the formed link between the template and an entity class is further stored a template type identifier and a user language identifier, the user language being used for forming values of auxiliary template elements.

9. The method of claim 1, wherein prior to displaying the template, the server retrieves the template from the database and inserts into the template the following elements: an element with an entity class identifier using information about the link between the template and the entity class; and an element enabling a program code library, the code intended to provide the user with an opportunity to form and store links between the template elements and entity class attributes, datasets, dataset fields, and the dataset aggregate functions.

10. The method of claim 1, wherein prior to displaying the template, the server retrieves the template from the database and inserts into the template the following elements: an element with an entity class identifier using information about the link between the template and the entity class; and an element with a program code intended to provide the user with an opportunity to form and store links between the template elements and entity class attributes, the datasets, the dataset fields, and the dataset aggregate functions.

11. The method of claim 1, wherein, for selecting the template element, pointing a cursor onto the template element by user, actions graphically marking of the element.

12. The method of claim 1, wherein the information about entity class attributes, datasets, dataset fields and dataset aggregate functions available for forming links, is displayed as lists, the lists include only available entity class attributes, datasets, dataset fields and dataset aggregate functions which are not yet associated with any template element.

13. The method of claim 1, wherein the information about entity class attributes, datasets, dataset fields and dataset aggregate functions available for forming links is displayed in a separate browser window or in a movable area within a window with the template and forming links with template elements is effected via employing a Drag-and-Drop technique.

14. The method of claim 1, wherein, after forming the link between the template element and the entity class attribute, or the dataset, or the dataset field or the dataset aggregate function, the linked template element becomes graphically marked.

15. The method of claim 1, wherein a sequence of child element indexes, an ID attribute value, an expression for a request, the expression written in XPath language, or a unique template value of the template element is used as a template element identifier.

16. The method of claim 1, wherein to retrieve template elements identifiers XPath request language is used.

17. The method of claim 1, wherein the automatically formed links of template elements with entity class attributes, datasets, dataset fields and dataset aggregate functions are stored on the server in the database.

18. The method of claim 1, further comprising dataset paths including numerical values in a string describing paths from the template root element to the said structural elements.

* * * * *